United States Patent
Foster et al.

(10) Patent No.: US 9,560,808 B2
(45) Date of Patent: Feb. 7, 2017

(54) SYSTEM FOR CONTROLLING BALE FORMING AND WRAPPING OPERATIONS

(75) Inventors: Christopher A. Foster, Denver, PA (US); John H. Posselius, Ephrata, PA (US); Mark K. Chow, Paoli, PA (US)

(73) Assignee: CNH Industrial America LLC, New Holland, PA (US)

( * ) Notice: Subject to any disclaimer, the term of this patent is extended or adjusted under 35 U.S.C. 154(b) by 315 days.

(21) Appl. No.: 13/089,505

(22) Filed: Apr. 19, 2011

(65) Prior Publication Data

US 2012/0266763 A1  Oct. 25, 2012

(51) Int. Cl.
| | |
|---|---|
| A01F 15/08 | (2006.01) |
| A01F 15/14 | (2006.01) |
| B30B 9/30 | (2006.01) |
| A01F 15/07 | (2006.01) |

(52) U.S. Cl.
CPC ......... *A01F 15/148* (2013.01); *A01F 15/0715* (2013.01); *A01F 15/08* (2013.01); *B30B 9/30* (2013.01); *A01F 2015/076* (2013.01)

(58) Field of Classification Search
CPC ........ A01F 15/07; A01F 15/08; A01F 15/148; A01F 15/0715; A01F 2015/076; G01N 2021/177; B30B 9/30
USPC .. 100/4, 8, 13, 87, 88; 56/64, 341; 382/108, 382/203, 209, 100; 53/52, 53, 64
See application file for complete search history.

(56) References Cited

U.S. PATENT DOCUMENTS

| | | |
|---|---|---|
| 4,228,638 A | 10/1980 | Rabe et al. |
| 4,509,075 A * | 4/1985 | Simms et al. ................ 348/129 |
| 4,624,179 A | 11/1986 | Yves et al. |
| 4,674,403 A | 6/1987 | Bryant et al. |
| 4,748,802 A * | 6/1988 | Strosser et al. ................ 56/341 |
| 4,765,235 A | 8/1988 | Schrag et al. |
| 4,850,271 A | 7/1989 | White et al. |
| 4,855,924 A * | 8/1989 | Strosser et al. ............... 700/117 |
| 4,885,991 A | 12/1989 | Borba |
| 4,924,405 A | 5/1990 | Strosser et al. |
| 4,936,810 A | 6/1990 | Strong et al. |
| 4,998,961 A | 3/1991 | Anderson et al. |
| 5,103,106 A | 4/1992 | Golberstein |
| 5,137,362 A * | 8/1992 | LeBeau ......................... 382/145 |
| 5,152,123 A * | 10/1992 | Viaud et al. .................... 53/508 |
| 5,182,987 A | 2/1993 | Viaud |
| 5,192,245 A | 3/1993 | Francis et al. |
| 5,231,828 A | 8/1993 | Swearingen et al. |
| 5,340,259 A | 8/1994 | Flaskey |
| 5,380,366 A | 1/1995 | Becker et al. |
| 5,388,504 A | 2/1995 | Kluver |
| 5,408,817 A | 4/1995 | Wagstaff |
| 5,551,218 A | 9/1996 | Henderson et al. |
| 5,631,826 A | 5/1997 | Chow |
| 5,749,783 A | 5/1998 | Pollklas |

(Continued)

FOREIGN PATENT DOCUMENTS

| | | | |
|---|---|---|---|
| DE | 19753704 A1 * | 6/1999 | ............ B65B 57/00 |
| EP | 1749437 A1 * | 2/2007 | |

(Continued)

*Primary Examiner* — Jimmy T Nguyen

(74) *Attorney, Agent, or Firm* — Rebecca L. Henkel; Rickard K. DeMille

(57) ABSTRACT

A system and method for controlling bale forming operations is disclosed. The system and method includes a monitoring system for visually imaging a portion of a bale and providing a warning to an operator if the bale is wrapped or shaped incorrectly.

16 Claims, 2 Drawing Sheets

(56) References Cited

U.S. PATENT DOCUMENTS

| | | |
|---|---|---|
| 5,842,920 A | 12/1998 | Siepker |
| 5,887,076 A * | 3/1999 | Takahashi et al. ........... 382/143 |
| 5,913,801 A | 6/1999 | Bottinger et al. |
| 5,964,391 A | 10/1999 | Cain et al. |
| 5,988,053 A | 11/1999 | Leupe et al. |
| H1819 H | 12/1999 | Anderson et al. |
| 6,035,773 A | 3/2000 | Rempe |
| 6,050,074 A | 4/2000 | Clostermeyer |
| 6,130,438 A | 10/2000 | Torai |
| 6,209,450 B1 | 4/2001 | Naaktgeboren et al. |
| 6,264,553 B1 | 7/2001 | Neumann et al. |
| 6,295,797 B1 | 10/2001 | Naaktgeboren et al. |
| 6,370,852 B1 | 4/2002 | Ohlemeyer et al. |
| 6,543,341 B2 | 4/2003 | Lopez |
| 6,557,336 B2 | 5/2003 | Lucand et al. |
| 6,587,772 B2 | 7/2003 | Behnke |
| 6,591,875 B2 | 7/2003 | Zaun et al. |
| 6,943,824 B2 | 9/2005 | Alexia et al. |
| 6,966,162 B2 | 11/2005 | Viaud et al. |
| 6,981,352 B2 | 1/2006 | Chow et al. |
| 7,063,614 B2 | 6/2006 | Vogelgesang et al. |
| 7,152,634 B2 | 12/2006 | Peters et al. |
| 7,400,957 B2 * | 7/2008 | Hofer et al. ................... 701/41 |
| 7,404,355 B2 * | 7/2008 | Viaud et al. ..................... 100/4 |
| 7,437,866 B2 | 10/2008 | Smith et al. |
| 7,448,316 B2 | 11/2008 | Posselius |
| 8,028,499 B2 * | 10/2011 | Viaud ............................ 53/399 |
| 8,200,399 B2 * | 6/2012 | Madsen .......................... 701/50 |
| 8,733,242 B2 * | 5/2014 | Viaud ........................... 100/348 |
| 2001/0018821 A1 | 9/2001 | Chow |
| 2002/0029542 A1 | 3/2002 | Davis et al. |
| 2003/0089081 A1 * | 5/2003 | Platon ............................ 53/399 |
| 2004/0016204 A1 | 1/2004 | Chow et al. |
| 2004/0182043 A1 | 9/2004 | Viaud et al. |
| 2006/0048654 A1 | 3/2006 | Biziorek |
| 2007/0028579 A1 | 2/2007 | Posselius |
| 2007/0056258 A1 | 3/2007 | Behnke |
| 2007/0186530 A1 | 8/2007 | Meier et al. |
| 2007/0280501 A1 * | 12/2007 | Walton .......................... 382/100 |
| 2008/0087177 A1 * | 4/2008 | Olander et al. ................... 100/5 |
| 2008/0171582 A1 * | 7/2008 | Hoskinson et al. ............... 460/2 |
| 2009/0107102 A1 | 4/2009 | Biziorek |
| 2009/0201379 A1 * | 8/2009 | Schultz et al. ........... 348/207.11 |
| 2009/0211073 A1 | 8/2009 | Pienta et al. |
| 2009/0286582 A1 | 11/2009 | Kormann |
| 2010/0288140 A1 * | 11/2010 | Smith et al. ....................... 100/5 |
| 2010/0310129 A1 * | 12/2010 | Hopfner ........................ 382/104 |
| 2013/0112094 A1 * | 5/2013 | Smith et al. ..................... 100/99 |

FOREIGN PATENT DOCUMENTS

| | | | |
|---|---|---|---|
| EP | 1813146 A2 * | 8/2007 | ............ A01F 15/08 |
| EP | 1935233 A1 * | 6/2008 | ............ A01F 15/08 |
| EP | 2250875 A2 * | 11/2010 | |
| JP | 403022914 A | 1/1991 | |

\* cited by examiner

SYSTEM FOR CONTROLLING BALE FORMING AND WRAPPING OPERATIONS

FIELD OF THE INVENTION

The present invention relates generally to agricultural machinery for use with crop harvesting devices. It relates more particularly to a monitoring method and system for detecting bale wrapping errors.

BACKGROUND OF THE INVENTION

For many years, agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into densified packages, otherwise known as bales, which would be cylindrically-shaped round bales in the case of a round baler. More specifically, the pickup of the baler gathers the cut and windrowed crop material from the ground then conveys the cut crop material with a conveyor, such as a rotating conveying rotor into a bale-forming chamber within the baler. The pickup assembly has a drive mechanism that operates to power both the pickup and the conveying rotor, and the pickup drive mechanism is operably connected to and driven by the main drive mechanism of the baler. The baling chamber comprises a pair of opposing sidewalls with a series of belts that rotate and compress the crop material into a cylindrical shape. When the bale has achieved a desired size and density the operator wraps the bale to ensure that the bale maintains its shape and density. The operator raises the tailgate of the baler and ejects the bale onto the ground. The tailgate is then closed and the cycle repeated as necessary and desired to manage the field of cut crop material.

Common practice has the baler wrap the bales with twine, net-like or continuous plastic sheeting. With twine, the bale is wrapped back and forth from side-to-side as the bale is turned, from a single dispensing mechanism, or back and forth from middle-to-side from as the bale is turned, from dual dispensing mechanisms with twine numerous time, the twine "gripping" the crop material and prior wrappings of twine adequately to hold the package together in a process is often referred to as "tying" or "wrapping". Net wrap is typically made of a woven plastic sheet, generally equal in width to the bale being formed, with regular openings there through and is over-lapped on itself to hold the package together. An adhesive may be used to improve the holding power of the net wrap. Plastic wrap, or film, is a generally continuous sheet of plastic, also generally the width of the bale being formed, with a somewhat adhesive surface that drips itself when overlapped and the crop material to form the package.

Once the bale is formed and tied or wrapped, it is ejected through the rear of the baler onto the field where it may sit until use, or may be collected into a central location for longer term storage. The tying and wrapping processes are subject to a number of failures or defaults. More particularly, the baler obviously carries a limited supply of packaging materials, so on occasion, the supplies run out and could result in the ejection of a bale that has been neither tied nor wrapped. Also, rips or tears do occur in the net wrap and plastic wrap materials, resulting in only partial coverage of the bale before ejection. Round bales are created under considerable pressure, so a tear or rip in the wrapping material is magnified with undesirable consequences in bale shape and rigidity.

In addition, the bale wrap or tie may become caught on a baler component such that the wrap or tie is wrapped onto the baler component instead of the bale. Without a method of detecting this error, an unwrapped or misshaped bale may be ejected from the bale chamber.

Practically, it is the operator's responsibility to look over his shoulder and try to monitor the progress of bale formation, its tying or wrapping, and its ejection all while driving the tractor. Not only is this a difficult responsibility to meet, it is impossible in some cases because many balers have components on the front thereof blocking a reasonable view of the bale.

What is needed is a baler that includes a system to detect bale forming and wrapping errors and to monitor bale forming and wrapping operations to avoid ejecting an improperly formed and/or wrapped bale from the baler.

The present disclosure is directed to overcoming one or more of the problems as set forth above.

SUMMARY OF THE INVENTION

The present disclosure relates to an agricultural baling system including a baler, and a bale monitoring system. The bale monitoring system includes an imaging system mounted on the baler for imaging a bale surface, and a warning device to indicate to an operator if a bale wrapped by the baler has been wrapped incorrectly.

The present disclosure relates to an agricultural baling system including a baler an a bale visual imaging system. The bale visual imaging system includes one or more imaging devices mounted on the baler for producing one or more visual image data sets of one or more surfaces of a bale. The bale visual imaging system further includes a control system configured to process the visual image data and to provide a bale status signal to an operator. The bale status signal is a bale wrap indication signal or a bale shape indication signal.

The present disclosure further relates to a bale imaging system including one or more imaging devices for producing one or more visual image data sets of one or more surfaces of a bale, and a control system configured to process the visual image data sets and to provide a bale status signal to an operator. The bale status signal is a bale wrap indication signal or a bale shape indication signal.

The present disclosure further related to a method of monitoring a baling operation including visually imaging a portion of a bale to produce visual image data of the bale, processing the visual image data to provide a bale status signal, and providing the bale status signal to an operator.

One advantage of the present disclosure is to provide a system and method for detecting a wrapping or tying error that results in an unwrapped or partially wrapped bale that provides a warning to the operator before ejecting the bale.

Another advantage of the present disclosure is to provide a system and method for detecting a bale shaping error that provides a warning to the operator before ejecting the bale.

Another advantage of the present disclosure is to provide a system and method that improves the efficiency of bale wrap operations.

Another advantage of the present disclosure is to provide a system and method for detecting bale wrapping or tying errors that can be retrofitted to an existing baler or part of a new bailer design.

Another advantage of the present disclosure is to verify the bale has completely ejected from the baler.

Another advantage of the present disclosure is to determine probable cause and/or location of a bale wrapping error.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present disclosure relates to a system and method for detecting a wrapping or tying error that results in an unwrapped or partially wrapped bale. The present disclosure further relates to a system and method of detecting a properly or improperly wrapped bale shape. The system and method provides information of the bale wrap tying and shaping operations to an operator before ejecting the bale.

Figure 1:
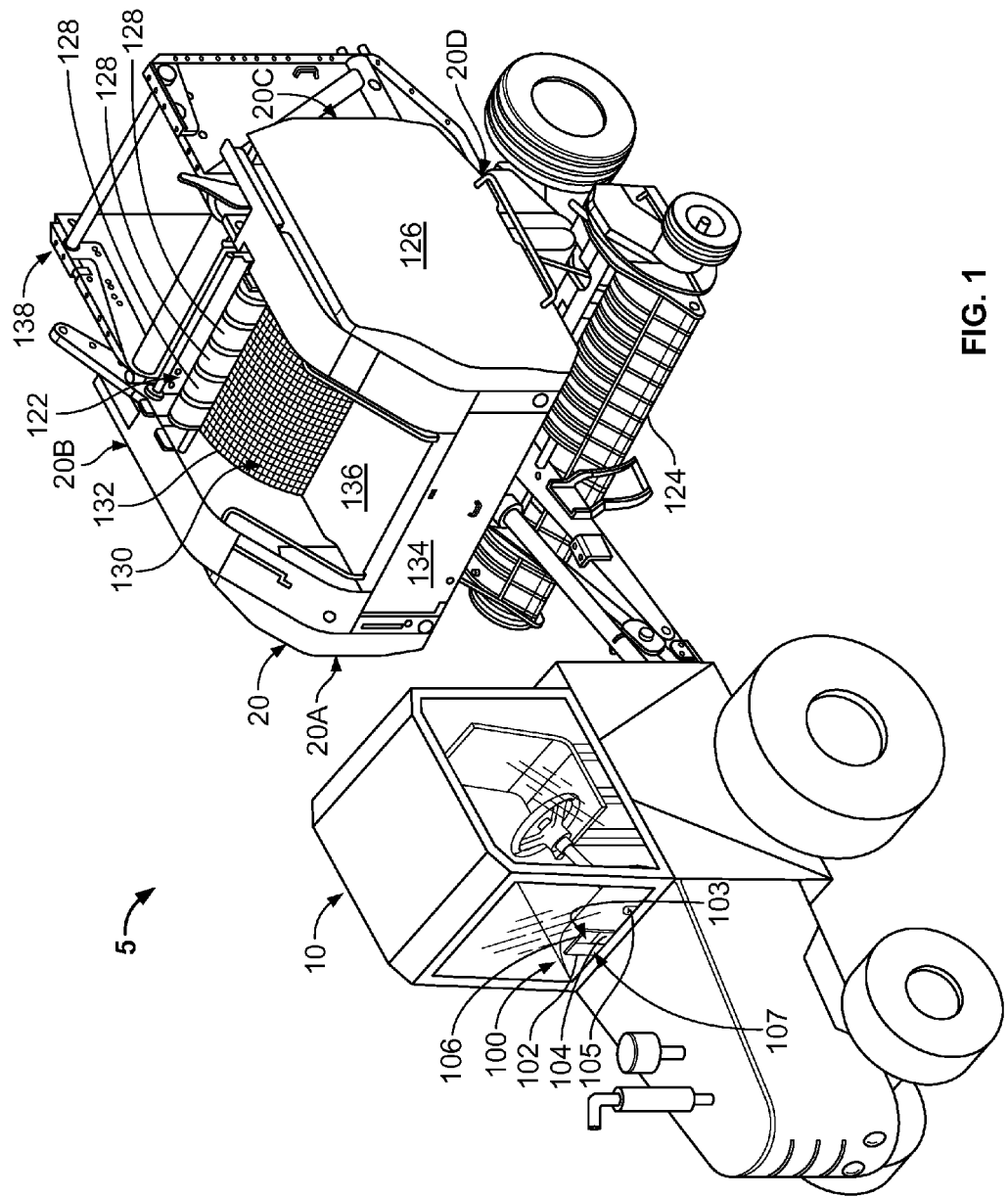
FIG. 1 is an illustration of an embodiment of an agricultural baling system according to the present disclosure.

FIG. 1 shows an embodiment of an agricultural baling system 5 including a vehicle 10, a baler 20, and a bale monitoring system 100 installed in the vehicle 10 and baler 20 according to the invention. In this exemplary embodiment, the vehicle 10 is a tractor having a cab 12. In another embodiment, the vehicle 10 may be a truck or agricultural vehicle capable of operating the baler 20.

Figure 2:
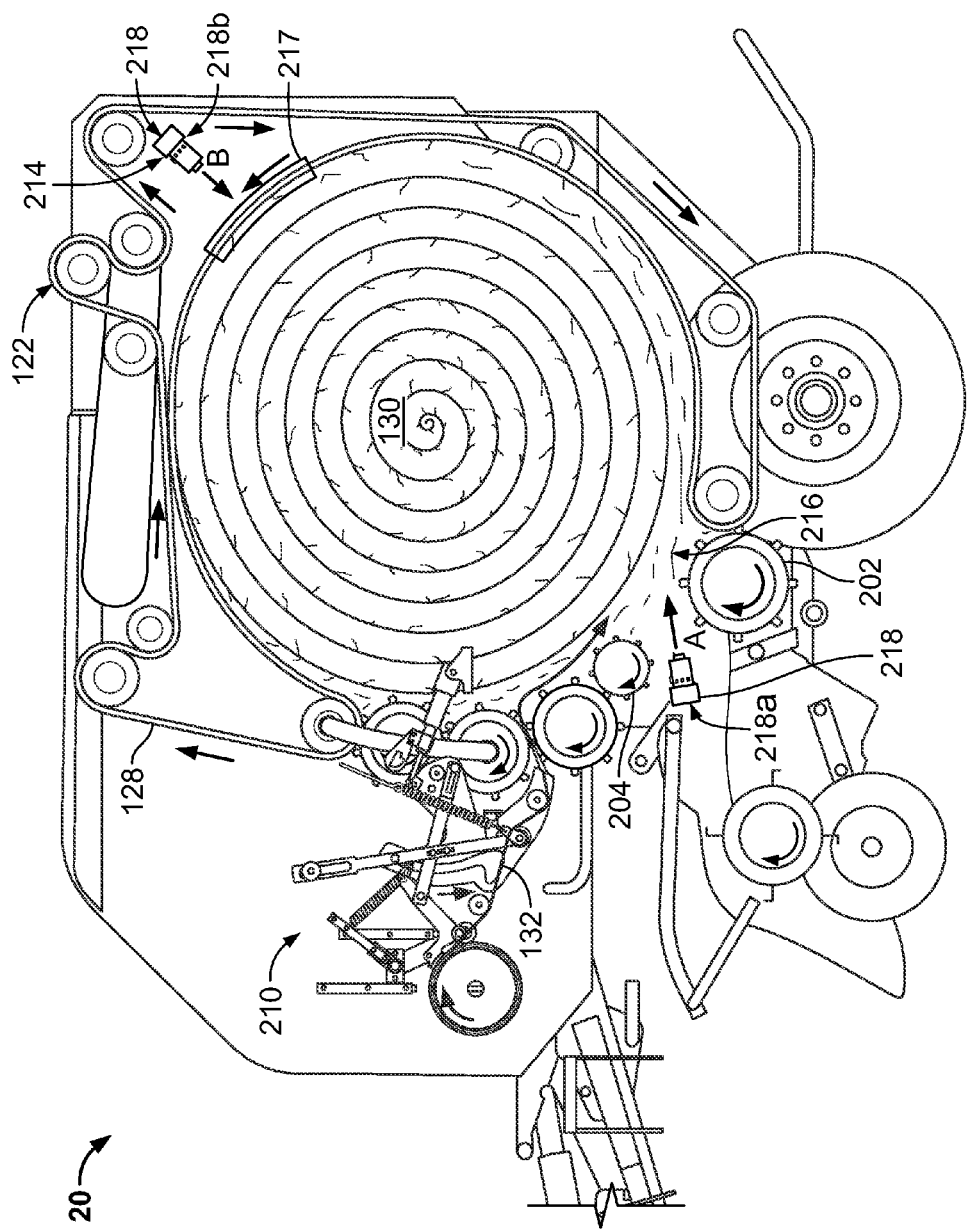
FIG. 2 is a sectional illustration of an embodiment of a baler according to the present disclosure.

Baler 20 includes a front section 20A, a top section 20B, a rear section 20C, and a bottom section 20D. Baler 20 further includes a bale forming mechanism 122 having a crop pickup 124 for moving a crop material from a field along and into a stuffer assembly 202 (not shown). The stuffer assembly 202 pushes the crop material into a bale chamber, which is a three-dimensional area between the side walls 126 and the changing volume generally within the bale-forming belts 128, a floor roll 202 and a starter roll 204, shown occupied by bale 212 (FIG. 2). A bale forming mechanism 122 may use a series of belts, pulleys and wheels to form a bale. In one embodiment, the baler 20 may have a bale forming mechanism 122 as generally described in U.S. Pat. Nos. 6,688,092, 6,295,797 and 6,170,246. In another embodiment, the baler 20 may use fixed rolls, slats, chains, belts or combination thereof as bale-forming devices.

Bale 130 is shown to be covered by a net wrap 132 that has been applied to the bale 130 by a net wrapping device 210 (FIG. 2). The bale 130 is partially covered by belts 128, which assist in the shaping of the bale 130. The belts 128 have been removed from the bale 130 in FIG. 1 for clarity. The rear of the baler 20 is generally closed at the rearward end thereof by a framed tailgate 138, which is pivotally attached at the top thereof for pivoted opening and closing either automatically by a control system or by manual triggering by an operator. In the open position, the tailgate triggers the ejection of the bale 130 onto the ground. The term "net wrap" in this disclosure includes, but is not limited to, twine, wrapping net fabric, wrapping sheet, and other wrapping material for securing a bale in a rolled configuration.

The bale monitoring system 100 includes a control system 102 and an imaging system 214 (FIG. 2). The control system 102 includes a control unit 104 and a warning device 105. In another embodiment, the control unit 104 and warning device 105 may be integrated into a single unit. In an embodiment, the control system 102 may be included in a vehicle operations display (not shown). The data transmitted between the control system 102 and the imaging system 214, and well as between various components of the control system 102 and imaging system 214, may be over wire or cable connections, wireless networks, and any combination thereof. In another embodiment, the bale monitoring system 100 may include other and/or additional control units and/or displays for operating the bale monitoring system 100.

The control unit 104 controls operation of the bale monitoring system 100, including, but not limited to power to the bale monitoring system components, movement and control of the one or more imaging devices 218 (FIG. 2), and/or selection of one or more of the one or more imaging devices 218 to display. The movement and control of the one or more imaging devices 218 will be described in greater detail later in this disclosure.

The control unit 104 includes a display device 106 displays a visual image generated by the one or more imaging devices 218 (FIG. 2) to the operator. In another embodiment, the display device 106 may be a separate component from the control unit 104. The display device 106 may display visual image frames and/or a continuous visual image of the bale 130. Additionally, the display device may display bale wrapping and shaping errors and/or associated data to the operator. The display device 106 may be a screen, panel or other image forming device, such as, but not limited to, a liquid crystal display, plasma display, or picture tube display that visually displays a visual image of one or more portions of the bale 130 (FIG. 2) to an operator. In an embodiment, the display device 106 may be a touch screen display. In this exemplary embodiment, the display device 106 is dedicated to the bale video display. In another embodiment, the display device 106 may be integrated into a vehicle operations system (not shown). In an embodiment, the display device 106 may provide one or more visual images of the bale circumferential surface 216 (FIG. 2) and/or one or more visual images of one or more portions of the bale circumferential profile.

The warning device 105 may provide a bale wrapping and/or shaping alarm to an operator to indicate if a bale has been wrapped and/or shaped correctly and/or incorrectly. The warning device 105 may be a visual or audible alarm device, such as, but not limited to, a light or audible alarm emitter. In another embodiment, the warning device 105 may be part of the control unit 104. In another embodiment, the warning device 105 may include one or more visual or/or audible alarm devices. In yet another embodiment, the warning device 105 may be mounted on the vehicle 10 and/or bailer 20. In this exemplary embodiment, the warning device 105 is dedicated to the bale wrapping alarm. In another embodiment, the warning device 105 may be integrated into a vehicle operations display/audible system of a vehicle operations system (not shown).

The control system 102 provides a bale status signal to the operator. The bale status signal may be one or more visual images of the bale surface and/or one or more error/pass signals indicating an improperly/properly wrapped bale and/ or an improperly/properly shaped bale. The one or more visual images may be one or more still or video images of the bale surface.

In one embodiment, the control system 102 provides a visual image display of one or more surfaces of the bale 130 from visual image data provided by one or more imaging devices 218 (FIG. 2). In another embodiment, the control system 102 may provide both a visual image display and a warning/indication, which may be in the form of an error/pass signal to the operator. In another embodiment, the control system 102 may comprise a control logic that processes the visual image data provided by the one or more imaging devices 218 to determine if the bale has been wrapped correctly and/or if the bale has been shaped correctly, and to provide a warning or indication, which may be an error/pass signal, to an operator indicating an incorrectly or improperly wrapped or shaped bale.

In determining if the bale is wrapped correctly and/or if the bale is shaped correctly, the control system 102 may identify one or more target areas in the image (bale surface and circumferential profile for wrapping, and bale circumferential profile for bale shape). In an embodiment, the control system 102 may identifying the area of the image by an image identification technique such as, but not limited to pattern recognition, where the general shape of the object to be analyzed is known from a provided data base, and an acceptable image is searched for in the image database. In an embodiment where the position of the one or more imaging devices 218 is fixed, the target region of the image for analysis based on input data may be known. In an embodiment, information from a bale size sensor may be used to modify the target analysis area in the image as the bale grows.

The control system 102 may analyze the targeted area of the image for the bale wrap detection using techniques such as analysing the texture of the target area in the image, where texture may be defined as the determining the graininess of the images and grain size through analysis of colour and contrast. For the bale shape detection, the control system 102 may analyse the circumferential profile of the bale and compare it to a data base of circumferential profiles. An acceptable circumferential profile may be, over a small portion of the circumference, estimated as a 'straight line', the straight line being the target profile shape. Mapping of the 'straight line' based on information on the focal length of the camera would probably be required if the camera was using a lens other than 50 mm. In an embodiment, an imaging device 218 may be used, such as a camera with a wide angle lens such that the 'straight line' appears as a curve line in the generated image. The degree of curvature may be determined by how far the line is from the center of the image, and this degree of curvature may be used to determine if the bale has a proper or improper bale shape.

The control system 102 includes a computer program product including a computational logic and/or algorithm for calculating a proper and/or improper bale wrap and/or bale shape. The computational logic is embedded on a non-transitory computer readable medium and executable by a microprocessor 103. The microprocessor generates an bale wrap and/or shape analysis, which may be in the form of a transitory display to the operator.

In one embodiment, the microprocessor is a computer, central processing unit (CPU), or electronic circuit board capable of executing command functions. The computer may be a portable computer, such as, but not limited to, a laptop computer. The microprocessor may include input devices, such as, but not limited to USB ports, ethernet ports, and disk drives. In another embodiment, the input device may include a wireless system for receiving data input for the control system 108. The microprocessor may also include a keyboard or other manual data entry device to manually receive a data input or commands. The microprocessor 103 may include a memory module 107. The memory module may include an internal and/or external memory module. For example, the memory module may be RAM, ROM or other memory for receiving and storing coded programs for executing the method of the present disclosure. The microprocessor may be included in the control unit 104, imaging system 214, one or more imaging devices 218, a separate CPU or microprocessor, or any combination thereof.

The control system 102 processes the visual image data and provides a system status signal to the display device 106 and/or warning device 105. In an embodiment, the control system 102 may indicate if the bale is wrapped correctly and/or incorrectly and/or if the bale has a correct or incorrect shape. In an embodiment, the control system 102 may provide a system status signal to the display device 106 and/or warning device 105 to display a green and/or red light indicating a proper/improper bale wrap and/or shape.

FIG. 2 shows the baler 20 having formed a bale 212 by the bale forming mechanism 122. The bale forming mechanism 122 has rotated the bale 130 in a counterclockwise rotation using bale-forming belts 128. As can be seen in FIG. 2, the baler 20 includes a bale net wrapping device 210 that is in the process of initially dispensing a net wrap 132 to be wrapped around the bale 212. As can further be seen in FIG. 2, the imaging system 214 is directed toward views of the bale 130.

In this embodiment, the imaging system 214 includes two imaging devices 218. In another embodiment, the imaging system 214 includes one or more imaging devices 218. Each imaging device 218 produces visual image data of the bale surface 216 and provides visual image data to the control system 102.

In this exemplary embodiment, the imaging device 218 is a photoelectric device, such as, but not limited to charge-coupled device (CCD) camera. In another embodiment, the imaging device 218 may be any electro-optical device capable of providing a digital data field representative of a visual image of the bale surface 216. As used and defined herein, the terms "visual image" means a pictorial image as perceived by the human eye, and "visual imaging" means producing a pictorial image as perceived by the human eye and composed of light of wavelengths in the visual spectrum. The imaging device 218 may capture the visual image in wavelengths above and below the visual light spectrum. In an embodiment, the imaging device 218 may capture the visual image in the infra-red spectrum. The visual image may be a still image and/or a continuous or live image. In an embodiment, the still image may be updated at a predetermined time interval.

The imaging devices 218 provides visual image data to the control system 102, which displays a real time image of the bale surface 216 to an operator. In an embodiment, a CCD camera may provide image data to a display device. In another embodiment, the visual image data produced by the imaging device 218 is also provided to the control system 102, where the visual image data is processed by an process algorithm to determine if the visual image of the bale surface 216 indicates if the bale has been properly or improperly wrapped and/or if the bale has a proper or improper bale shape. As used herein, improperly wrapped is intended to mean that the net wrap is missing, partially missing, missed aligned, and/or any combination thereof. Also as used herein, improper bale shape is determined by comparing the circumferential arc of the bale shape to a predetermined arc deviation standard to provide bale shape status, such as, but not limited to size, shape and shape errors.

A first imaging device 218a is mounted to view a portion of the bale circumferential surface 216 from a location "A" downstream of the point of application of the net wrap 132. Location A may be referred to as a baler throat position. In this location, the first imaging device 218a may view the portion of the bale circumferential surface 216 to determine if the wrap net 132 has been properly applied to the bale 130. The first imaging device 218a may be mounted on a sidewall 126 (FIG. 1) or on a structure proximate to location A. In another embodiment, the first imaging device 218a may be mounted at another location where the bale circumferential surface 216 may be observed. In yet another embodiment, the first imaging device 218a may include one or more imaging devices located at one or more locations where one or more portions of the bale circumferential surface may be observed. The first imaging device 218a provides a bale visual image data to the control monitoring system 100 (FIG. 1) to indicate to an operator if the bale 130 has been properly or improperly wrapped. In another embodiment, the first imaging device 218a may be omitted.

A second imaging device 218b is mounted to view a portion of the bale circumferential profile 217 from a location "B" downstream of the point of application of the net wrap 132. Location B may be referred to as a rear bale position. In this location, the second imaging device 218b may view a portion of the bale circumferential profile 217 to determine if the bale 130 has an acceptable shape. The second imaging device 218b may be mounted on a sidewall 126 (FIG. 1) or on a structure proximate to location B. In another embodiment, the second imaging device 218b may be mounted at another location where the bale surface 216 may be observed. In yet another embodiment, the second imaging device 218b may include one or more imaging devices located at one or more locations where the bale surface may be observed. The second imaging device 218b provides bale image data to the control system 102 (FIG. 1) to indicate to an operator if the bale 130 has been properly or improperly shaped. In another embodiment, the second imaging device 218b may be omitted.

In this exemplary embodiment, the bale monitoring system 100 has been initially designed into the vehicle 10 and baler 20 during fabrication of the baler. In another embodiment, the bale monitoring system 100 may be installed into an existing vehicle 10 and/or baler 20.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural baling system, comprising:
   a baler comprising a crop pickup, a bale chamber, and a net wrapping device, wherein the crop pickup is configured to receive crop material from a field, the bale chamber is configured to receive the crop material from the crop pickup and to facilitate formation of a bale from the crop material, and the net wrapping device is configured to apply a bale wrap to secure the bale in a rolled configuration; and
   a bale monitoring system comprising:
      one or more imaging devices mounted on the baler and configured to output visual image data indicative of at least one of a circumferential surface of the bale and a circumferential profile of the bale; and
      a control system comprising a processor communicatively coupled to a memory, wherein the processor is configured to receive the visual image data, to determine whether a bale wrap is properly applied by analyzing at least one of the visual image data indicative of the circumferential surface of the bale to identify a missing bale wrap, a partially missing bale wrap, a misaligned bale wrap, or a combination thereof, wherein the bale wrap is properly applied if the bale wrap is not missing, not partially missing, and not misaligned, to determine whether the bale is properly shaped by comparing the visual image data indicative of the circumferential profile of the bale to an arc deviation standard, and to output a bale status signal to an operator indicative of at least one of an improperly or properly wrapped bale and an improperly or properly shaped bale.

2. The system of claim 1, wherein the bale status signal comprises a visual image display of at least one of the circumferential surface of the bale and the circumferential profile of the bale.

3. The system of claim 1, wherein the one or more imaging devices comprises a first imaging device configured to visually image the circumferential surface of the bale.

4. The system of claim 1, wherein the one or more imaging devices comprises a second imaging device configured to visually image the circumference profile of the bale.

5. The system of claim 1, wherein the control system comprises a display device configured to display the visual image data to the operator.

6. The system of claim 1, wherein the one or more imaging devices comprise one or more charge-coupled device cameras.

7. The system of claim 1, wherein the control system further comprises a visual or audible warning device.

8. A bale imaging system, comprising:
   one or more imaging devices configured to mount on a baler and to output visual image data indicative of at least one of a circumferential surface of a bale and a circumferential profile of the bale; and
   a control system comprising a processor communicatively coupled to a memory, wherein the processor is configured to receive the visual image data, to determine whether a bale wrap is properly applied by analyzing at least one of the visual image data indicative of the circumferential surface of the bale to identify a missing bale wrap, a partially missing bale wrap, a misaligned bale wrap, or a combination thereof, wherein the bale wrap is properly applied if the bale wrap is not missing, not partially missing, and not misaligned, to determine whether the bale is properly shaped by comparing the visual image data indicative of the circumferential profile of the bale to an arc deviation standard, and to output a bale status signal to an operator indicative of at least one of an improperly or properly wrapped bale and an improperly or properly shaped bale.

9. The system of claim 8, wherein the bale status signal comprises a visual image display of at least one of the circumferential surface of the bale and the circumferential profile of the bale.

10. The system of claim 8, wherein the one or more imaging devices comprises a first imaging device configured to visually image the circumferential surface of the bale.

11. The system of claim 8, wherein the one or more imaging devices comprises a second imaging device configured to visually image the circumference profile of the bale.

12. The system of claim 8, wherein the control system comprises a display device configured to display the visual image data to the operator.

13. The system of claim 8, wherein the one or more imaging devices comprise one or more charge-coupled device cameras.

14. The system of claim 8, wherein the control system further comprises a visual or audible warning device.

15. The system of claim 1, wherein the processor is configured to identify the circumferential surface of the bale within the visual image data by searching the visual image data for a pattern indicative of the circumferential surface of the bale.

16. The system of claim 8, wherein the processor is configured to identify the circumferential surface of the bale within the visual image data by searching the visual image data for a pattern indicative of the circumferential surface of the bale.

* * * * *